(12) United States Patent
Marsh

(10) Patent No.: US 8,151,997 B2
(45) Date of Patent: Apr. 10, 2012

(54) HORIZONTAL BELT VACUUM FILTER WITH OVERHEAD FLUID REMOVAL

(75) Inventor: Robert Marsh, Draper, UT (US)

(73) Assignee: Flsmidth A/S (DK)

( * ) Notice: Subject to any disclaimer, the term of this patent is extended or adjusted under 35 U.S.C. 154(b) by 0 days.

(21) Appl. No.: 12/956,024

(22) Filed: Nov. 30, 2010

(65) Prior Publication Data

US 2011/0132832 A1    Jun. 9, 2011

Related U.S. Application Data

(63) Continuation-in-part of application No. 12/631,915, filed on Dec. 7, 2009.

(51) Int. Cl.
*B01D 33/048* (2006.01)
*B01D 33/056* (2006.01)

(52) U.S. Cl. ........ 210/400; 210/401; 210/396; 210/297; 210/406

(58) Field of Classification Search .................. 210/400, 210/401, 396, 397, 297, 406
See application file for complete search history.

(56) References Cited

U.S. PATENT DOCUMENTS

| | | | |
|---|---|---|---|
| 3,891,549 A | 6/1975 | Carmel et al. | |
| 3,984,329 A * | 10/1976 | Wenzel et al. | 210/396 |
| 4,123,360 A | 10/1978 | Havalda | |
| 4,324,659 A | 4/1982 | Titoff | |
| 4,595,499 A | 6/1986 | Kormanik | |
| 4,602,998 A * | 7/1986 | Goron | 210/396 |
| 4,964,334 A | 10/1990 | Jay | |
| 5,059,322 A * | 10/1991 | Austin | 210/396 |
| 5,560,834 A | 10/1996 | Gold | |
| 6,053,333 A * | 4/2000 | Hannah et al. | 210/400 |
| 7,344,033 B2 | 3/2008 | Sasaki | |
| 2004/0134863 A1 | 7/2004 | Tapp | |
| 2007/0090025 A1 | 4/2007 | Strand | |
| 2008/0110838 A1 | 5/2008 | Moss | |

FOREIGN PATENT DOCUMENTS

JP            58128299 A    *  7/1983

* cited by examiner

*Primary Examiner* — Thomas M Lithgow
(74) *Attorney, Agent, or Firm* — Jeffrey A. Sharp; Aaron M. Pile; Daniel DeJoseph

(57) ABSTRACT

A horizontal belt filter incorporates a filter web, a belt carrying the web in a substantially horizontal plane, at least one fluid removal member disposed above the web, at least one fluid guide disposed at an end of the fluid removal member and adjacent the web and the belt for receiving liquid runoff channeled to the guide by the fluid removal member, and a rake member disposed above the web on a downstream side of the fluid removal member. The fluid removal member may include at least two linear or straight bars each disposed at an acute angle relative to a respective edge of the filter web, the linear bars being connected to one another to form a V-shaped composite bar having an apex at an upstream side of the direction of belt travel.

16 Claims, 3 Drawing Sheets

HORIZONTAL BELT VACUUM FILTER WITH OVERHEAD FLUID REMOVAL

CLAIM OF PRIORITY

This continuation-in-part application claims priority from and the benefit of the filing date of non-provisional utility application Ser. No. 12/631,915, filed Dec. 7, 2009.

BACKGROUND OF THE INVENTION

This invention relates to horizontal belt vacuum filters. Horizontal belt vacuum filters typically comprise a rubber belt that supports a fabric filter web of like width. The belt and the web are held by rollers and moved along an endless path. The belt is provided with channels that underlie the filter cloth and is further provided with holes that communicate with vacuum boxes or pans disposed beneath the upper stretch of belt and web. A feed slurry is uniformly deposited over the full width of the filter by a top feed arrangement. This eliminates cake formation problems associated with fast settling material. Gravity helps reduce vacuum energy requirements and cake formation time. The cake travels with the filter media and dewatering is accomplished by applying suction from the filter boxes through the holes and channels in the rubber belt and the weave of the filter media. Wash liquid is applied to the cake in one or more independent washing zones to optimize product recovery. Filtrate and air enter the vacuum receiver(s) where the liquid drops out and is pumped away. Air exits at the top of the receiver due to negative pressure developed by the vacuum pump. Cake is discharged as the filter media travel around a small roller after separating from the rubber drainage belt. Multiple wash sprays clean the drainage belt and filter media independently to extend the service life of both. Continuous tension is maintained on the belt and the filter media. Sensors control positive automatic tracking and alignment of the filter media.

Horizontal belt vacuum filters can be applied to extract liquids from many different slurries including fibrous materials, fine slimes, and coarse granular materials. The filters can provide high extraction efficiency, low cake moisture, increased production, and reduced operating costs while achieving maximum filtration area in comparison to other filter options.

One area of increasing demand for horizontal belt vacuum filters is in the treatment of oil sands tailings.

Oil sands, also known as tar sands, or extra heavy oil, are a type of bitumen deposit. The sands are naturally occurring mixtures of and or clay, water and an extremely dense and viscous form of petroleum called bitumen. They are found in large amounts in many countries throughout the world, but are found in extremely large quantities in Canada and Venezuela.

Oil sands reserves have only recently been considered to be part of the world's oil reserves, as higher oil prices and new technology enable them to be profitably extracted and upgraded to usable products. Oil sands are often referred to as unconventional oil or crude bitumen, in order to distinguish the bitumen and synthetic oil extracted from oil sands from the free-flowing hydrocarbon mixtures known as crude oil traditionally produced from oil wells.

Oil sands bitumen is utilized for synthetic crude oil (SCO) production by surface mining, bitumen extraction followed by primary (coking) and secondary (catalytic hydrotreating) upgrading processes. SCO is further refined in specially designed or slightly modified conventional refineries into transportation fuels. Oil sands tailings, composed of water, sands, silt, clay and residual bitumen, are produced as a byproduct of the bitumen extraction process. The tailings have poor consolidation and water release characteristics. For over twenty years, significant research has been performed to improve the consolidation and water release characteristics of the tailings. Several processes were developed for the management of oil sands tailings, resulting in different recovered water characteristics, consolidation rates and consolidated solid characteristics. These processes may affect the performance of the overall plant operations.

When oil sands tailings are placed on a horizontal belt filter, bitumen blinds the surface of the cake before all of the free liquid has passed through the cake. If this surface is raked, to rearrange the particulates in the cake and allow for a more thorough extraction of liquid (aqueous) content, the remaining liquid forms another surface film immediately. In the treatment of oil sands tailings, raking generally reduces filter media life inasmuch as the filter cloth becomes quickly clogged with bitumen and fine particulate material

SUMMARY OF THE INVENTION

The present invention aims to improve horizontal belt filters particularly for the treatment of oil sands tailings.

A horizontal belt filter in accordance with the present invention comprises a filter web, a belt carrying the web in a substantially horizontal plane, at least one rake member disposed above said web, and at least one fluid removal member disposed above said web on an upstream side of said rake member.

In one embodiment of the invention, the fluid removal member takes the form of at least one channeling dam disposed above the web. In that embodiment, at least one collection trough is disposed at a functional end of the dam for receiving liquid runoff channeled to the trough by the darn.

Pursuant to another feature of the present invention, where the web has a pair of opposing longitudinal edges, the fluid removal member extends completely across the filter web and at least from one edge of the web to the other edge. The fluid removal member may extend beyond the edges of the web.

Pursuant to a further feature of the present invention, the fluid removal member includes at least one bar. The bar may be linear, arcuate, segmented, etc., but preferably includes at least two linear or straight bars each disposed at an acute angle relative to a respective one of the filter web edges, the linear bars being connected to one another to form a V-shaped composite bar having an apex at an upstream side of belt travel. (The fluid removal member points opposite the direction of belt travel.)

The belt filter may further comprise at least one frame that carries at least a portion of the fluid removal member and the rake. Where two rails are disposed alongside and parallel to respective edges of the filter media (and the drainage belt), the frame is supported on one or both of the rails.

Preferably, there are at least two fluid collection guides or troughs disposed adjacent and along opposite edges of the web (and concomitantly adjacent and along opposite edges of the belt). One of the troughs receives fluid runoff channeled thereto by a first one of the linear or straight bars. The other trough receives fluid runoff channeled thereto by a second one of the linear or straight bars. The collection troughs are supported at least in part on respective ones of the rails.

In another embodiment of the present invention, the fluid removal member takes the form of at least one suction bar disposed above the web which collects the fluids for removal and further processing.

The rake member may be stationary relative to the frame(s). Alternatively, the rake member may be rotatably mounted to the frame(s). In the latter case, the rake member may have a screw or worm configuration.

In a horizontal belt filter in accordance with the present invention, the fluid removal member serves to clear, from an upper surface of a slurry layer, an aqueous film that includes suspended particles that can clog the pores in a filter fabric and drastically reduce the effective life of the filter media. In particular, in drying oil sands tailings and separating the solid cake phase from the bitumen and water content, a horizontal belt filter in accordance with the present invention removes an aqueous surface film with suspended dust and bitumen hydrocarbons prior to a raking of the granular materials, thereby obviating a falling of bitumen hydrocarbons and entrained dust into grooves formed by the raking process and into the pores in the filter media. Accordingly, a horizontal belt filter in accordance with the present invention serves to lengthen the life of the filter media and concomitantly the interval between necessary maintenance procedures

DETAILED DESCRIPTION

Figure 1:
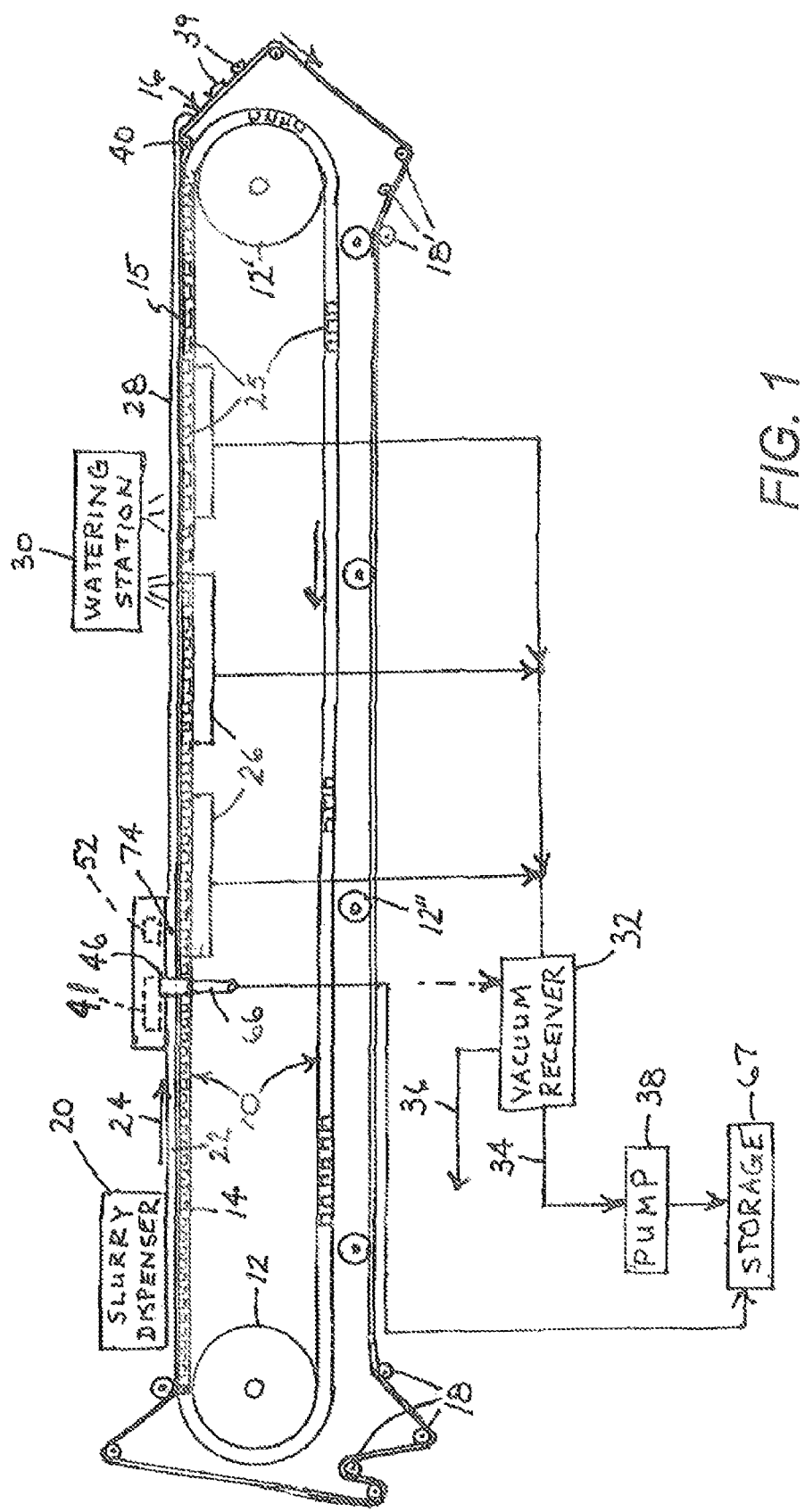
FIG. 1 is a schematic side elevational view of a horizontal belt filter in accordance with the present invention.

As depicted in FIG. 1, a horizontal belt vacuum filter comprises a rubber belt 10 supported by rotatable cylinders 12, 12', 12" for motion around an endless path. An upper section 14 of belt 10 is disposed in a substantially horizontal plane and supports an upper section 15 of fabric filter web 16 of like width in that horizontal plane. Filter media or web 16 also travels along an endless path and is held by rollers 18, 18' disposed at spaced locations along the path. A dispenser 20 disposed over an upstream end of belt section 14 deposits a layer of feed slurry 22 such as oil sands tailings uniformly over the full width of filter web 16, in a top feed arrangement. The deposited slurry 22 travels with filter web or media 16, as indicated by a direction of travel arrow 24, and is dried to form a cake 28.

Belt 10 is provided with transversely oriented channels or grooves 25 that underlie the filter web 16 and is further provided with one or more holes (not shown) in each channel or groove, the holes communicating with vacuum pans or boxes 26 disposed beneath the upper section 14 of belt 10. Dewatering of feed slurry or cake 22 is accomplished by applying suction via the filter pans 26. Under suction, filtrate is pulled from feed slurry or cake 22 through filter web 16, along the channels or grooves in belt 10, through the holes in the bases of the channels or grooves, and into filter pans 26.

Wash liquid is applied to the partially dried cake 28 at one or more independent washing stations 30 to optimize product recovery.

Filtrate and air from vacuum pans 26 enter a vacuum receiver(s) 32 where the liquid drops out at 34 and is pumped away. Air exits at the top (36) of receiver(s) 32 due to negative pressure developed by a vacuum pump 38. Dried cake 28 is discharged at 39 as filter web 16 travels around a small roller 40 after separating from the upper section 14 of drainage belt 10. Multiple wash sprays (not shown) are provided to clean belt 10 and filter web 16 independently. Continuous tension is maintained on belt 10 and filter web 16. Sensors (not shown) control positive automatic tracking and alignment of filter web 16.

The horizontal belt filter of FIG. 1 further comprises at least one fluid removal member 41, such as a channeling dam 42 or a suction bar 78 (See FIG. 4), disposed above filter web 16 and, for each such dam 42, at least one and preferably two or more collection troughs 44 and 46. Troughs 44 and 46 are disposed at respective functional ends of dam 42 and proximate respective edges 48 and 50 (see FIGS. 2 and 3) of web 16 for receiving liquid runoff channeled to the troughs by the dam. (Typically, opposing longitudinal edges of belt 10 are parallel to and directly beneath edges 48 and 50 of web 16, web 16 being transversely coextensive with belt 10.) A rake member 52 is disposed above web 16 on a downstream side of dam 42.

Figure 2:
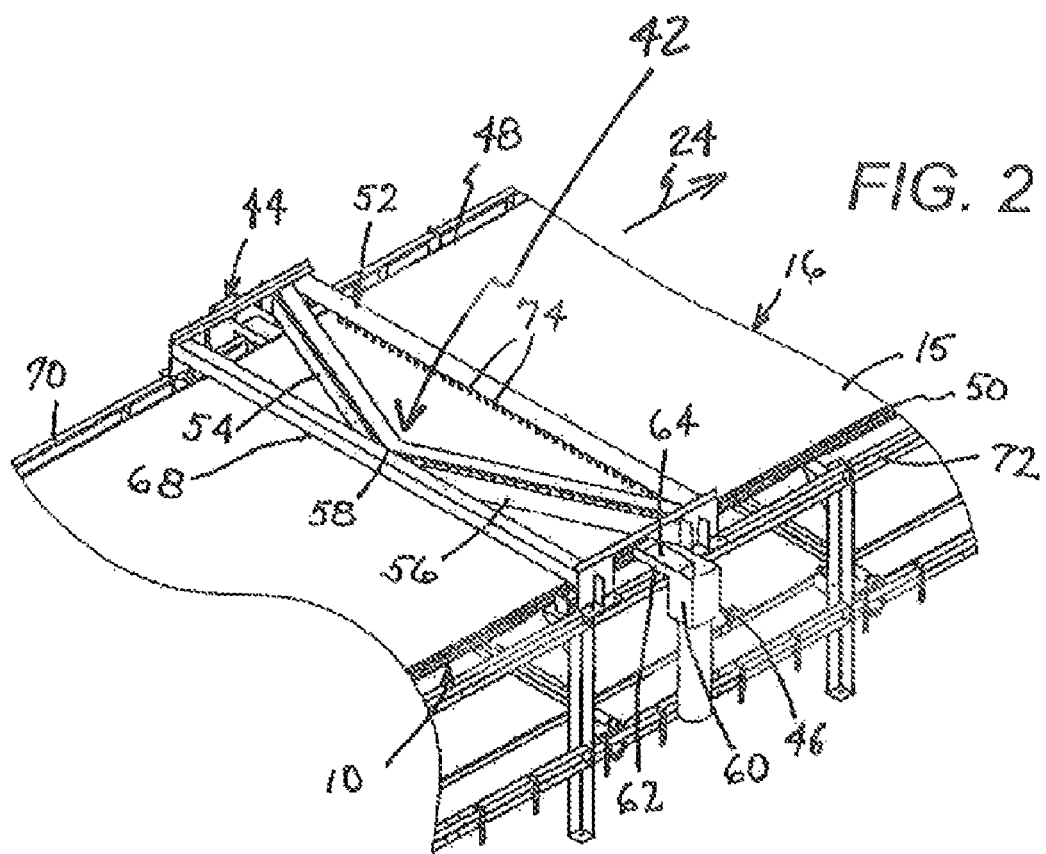
FIG. 2 is a partial perspective view of the horizontal belt filter of FIG. 1.
Figure 3:
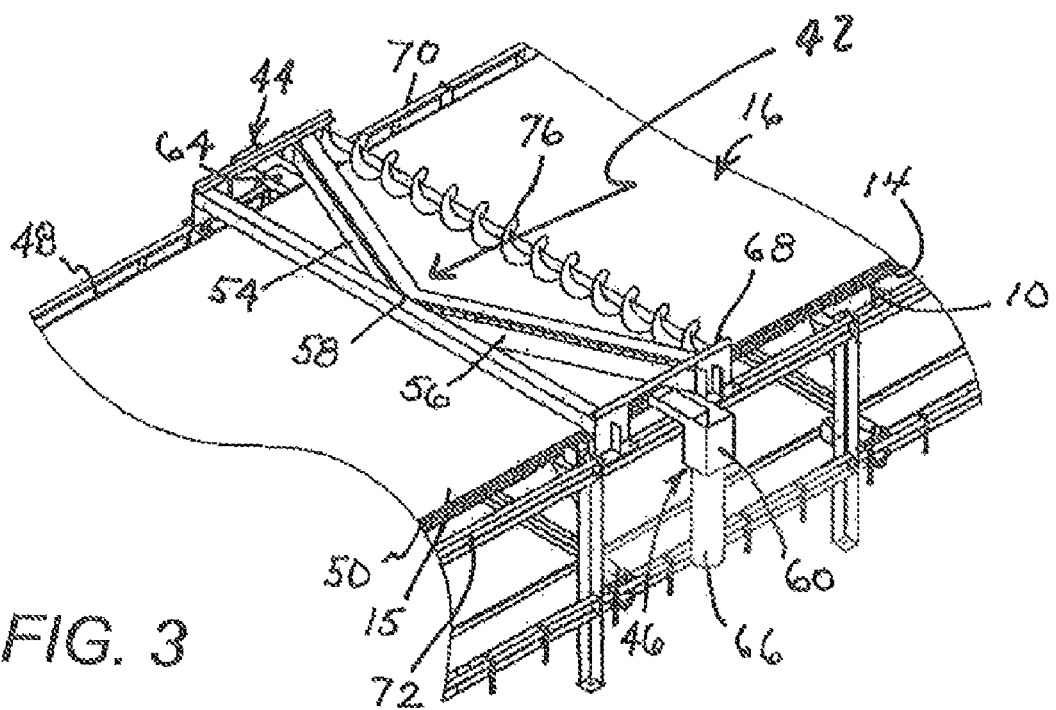
FIG. 3 is a partial perspective view showing a modification of the horizontal belt filter of FIGS. 1 and 2.

Dam 42 extends completely across filter web 16, from the one edge 48 of the web to the other edge (see FIGS. 2 and 3). Dam 42 may itself extend beyond edges 48 and 50 of web 16, but troughs 44 and 46 would generally be positioned to receive runoff from atop of the slurry layer and eventual filter cake 28 formed upon upper web section 15 at, or proximate, edges 48 and 50, or wherever the functional ends of dam 42 may complete their damming/flowing function, all depending on the specific shape and flow characteristics of the specific dam design, e.g., a straight or linear edge, a scoop, a channel with outer and/or eventually including lower perforations.

As illustrated in FIG. 2, in this case, dam 42 includes a pair of linear or straight bars 54 and 56 each disposed at an acute angle relative to a respective one of the filter web edges 48 and 50. Bars 54 and 56 are connected to one another so as to provide dam 42 with a composite V-shape having an apex 58 at an upstream side of travel of belt 16. Dam 42 thus points opposite to the direction of belt travel 24.

One collection trough 44 receives fluid runoff channeled thereto by a bar 54, while the other collection trough 46 receives fluid runoff channeled thereto by bar 56. Troughs 44 and 46 each include a main body 60 and an extension 62 having an inclined bottom surface 64 that drains incoming fluid into the main body. Trough body 60 is connected at a lower end to a pipe or hose 66 that guides the fluid to a storage receptacle 67 such as a holding tank or pond or alternatively to vacuum receiver 32.

Dam 42 and rake member 52 are mounted to a frame 68. Frame 68 is in turn supported on two rails 70 and 72 disposed alongside and parallel to edges 48 and 50 of filter web 16 (and the drainage belt 10). Collection troughs 44 and 46 are also supported at least in part on respective rails 70 and 72.

In the embodiment of FIG. 2, rake member 52 is a rigid member stationary relative to frame 68 and provided with downwardly projecting teeth 74. Alternatively, as shown in FIG. 3, a rake member 76 may be rotatably mounted to frame 68 and have a screw or worm configuration.

Where the horizontal belt filter described above is employed in the treatment of oil sands tailings, dam 42 is a bitumen channeling dam that removes free surface water remaining on top of oil sands tailings cake 28. Dam 42 moves the water and associated bitumen hydrocarbons from atop cake 28 laterally to the sides of filter web 16 and belt 10. The fluids are collected and pumped away for further processing. Rake 52 or 76 scrapes and rearranges the cake film, enhancing further separation and drying.

Figure 4:
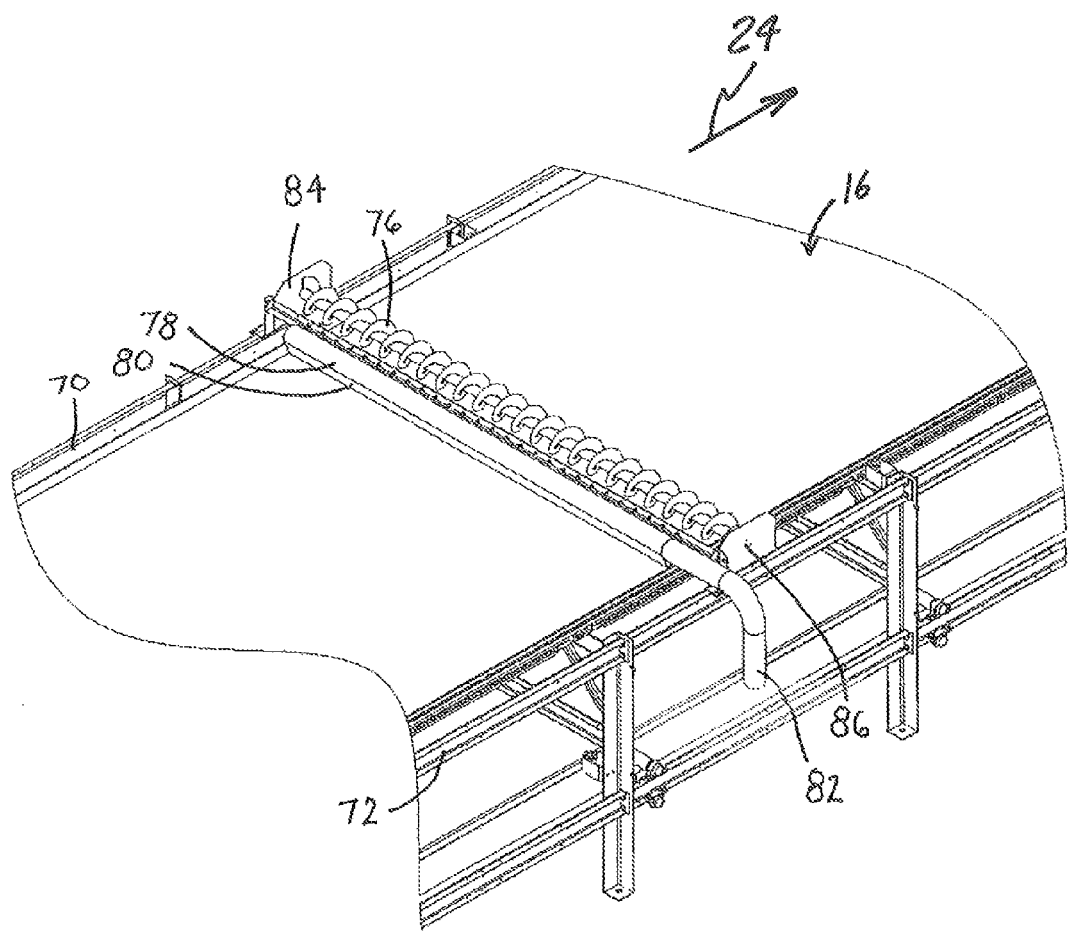
FIG. 4 is a partial perspective view of another embodiment of a horizontal belt filter in accordance with the present invention.

FIG. 4 depicts an alternative means for removing water and associated bitumen hydrocarbons from atop cake 28 prior to the raking of the cake by rake member 52 or 76. Instead of channeling dam 42, a suction bar 78 is disposed above filter web 16 adjacent to and upstream of rake member 52 or 76 (76 shown). Suction bar 78 includes an elongate nozzle 80 with one or more inlets (not shown) that are positioned close enough to cake 28 to aspirate an effective amount of water and associated bitumen hydrocarbons from atop cake 28 so that the furrowing, churning or mixing of cake 28 by rake member 52 or 76 does not result in a premature clogging of filter web 16.

Suction bar 78 is supported on rails 70, 72 and connected to at least one pipe or tube 82 that extends to a suction source, for instance, vacuum receiver 32 and pump 38 (See FIG. 1). As shown in FIG. 4, two frame members or brackets 84, 86 are provided that carry the opposite ends of the rake member 76 (or 52) and the suction bar 78. Where the horizontal belt filter described above is employed in the treatment of oil sands tailings, suction bar 78 removes free surface water remaining on top of oil sands tailings cake 28. The fluids are collected and pumped away for further processing Although the invention has been described in terms of particular embodiments and applications, one of ordinary skill in the art, in light of this teaching, can generate additional embodiments and modifications without departing from the spirit of or exceeding the scope of the claimed invention. For instance, the function of channeling dam 42 may be performed by a single linear bar extending across the entire width of the filter media or web 16 and inclined at an acute angle to edges 44 and 46 thereof (and underlying belt 10). In that case, only a single collection trough would be necessary. Also, bars 54 and 56 need not be linear: for example, an arcuate fox in, either concave or convex on an upstream side, is a possible alternative. Several channeling dams may also be provided, each extending over a portion or the entirety of the filter web width. Collectively, the dams would generally extend over the entire width of filter web 16. Concomitantly, multiple, and/or variously functional, rakes may be provided.

Similarly, the function of suction bar 78 may be performed by two or more nozzles both disposed above web 16 upstream of the same rake member 52 or 76. Each such nozzle might extend partially or completely across the width of the filter media or web 16 and may be optionally inclined relative to edges 44 and 46 thereof (and relative to the longitudinal edges of underlying belt 10). Bar 78 may have a curved, bent or angled shape (for example a V-shape like dam 42).

Accordingly, it is to be understood that the drawings and descriptions herein are proffered by way of example to facilitate comprehension of the invention and should not be construed to limit the scope thereof.

What is claimed is:

1. A horizontal belt filter comprising:
a filter web;
a belt carrying said web in a substantially horizontal plane; and
at least one fluid removal member disposed above said web,
wherein said fluid removal member comprises at least one channeling dam having a bar, and at least one collection trough disposed at a functional end of said dam for receiving liquid runoff channeled to said trough by said dam, wherein said at least one collection trough is disposed adjacent and along a longitudinal edge of said web and concomitantly adjacent and along a respective longitudinal edge of said belt, collection trough receives fluid runoff channeled thereto by said bar.

2. The belt filter defined in claim 1, wherein said bar is a linear or straight member.

3. The belt filter defined in claim 1, wherein said web has a pair of opposing longitudinal edges, and wherein said fluid removal member extends completely across said web and at least from one of said longitudinal edges to the other.

4. The belt filter defined in claim 1, further comprising at least one rake member disposed above said web on a downstream side of said fluid removal member.

5. The belt filter defined in claim 1, wherein said web has a pair of opposing longitudinal edges and said channeling dam includes at least two bars, each bar disposed at an acute angle relative to a respective one of said longitudinal edges of the web, said bars being connected to one another to form a generally V-shaped composite bar having an apex at an upstream side.

6. The belt filter defined in claim 1, wherein said web has a pair of opposing longitudinal edges and the horizontal belt filter further comprises a pair of rails disposed alongside and parallel to respective ones of said longitudinal edges of the web, said fluid removal member being supported on said rails.

7. The belt filter defined in claim 6, wherein said at least one collection trough are supported at least in part on respective ones of said pair of rails.

8. A horizontal belt filter comprising:
a filter web;
a belt carrying said web in a substantially horizontal plane;
at least one rake member disposed above said web;
at least one fluid removal member disposed above said web on an upstream side of said rake member;
wherein said fluid removal member takes the form of at least one channeling dam disposed above said web, further comprising at least one collection trough disposed at a functional end of said dam for receiving liquid runoff channeled to said trough by said dam;
wherein said web has a pair of opposing longitudinal edges and wherein said fluid removal member extends completely across said web and at least from one of said edges to the other;
wherein said fluid removal member includes at least two linear or straight bars each disposed at an acute angle relative to a respective one of said edges, said bars being connected to one another to form a V-shaped composite bar having an apex at an upstream side;
wherein the belt filter further comprises a pair of rails disposed alongside and parallel to respective ones of said edges, said fluid removal member being supported on said rails; and
wherein said trough is one of at least two collection troughs disposed adjacent and along opposite edges of said web and concomitantly adjacent and along opposite edges of said belt, one of said troughs receiving fluid runoff channeled thereto by a first one of said linear or straight bars, the other of said troughs receiving fluid runoff channeled thereto by a second one of said linear or straight bars, said collection troughs being supported at least in part on respective ones of said rails.

9. A horizontal belt filter comprising:
a filter web;
a belt carrying said web in a substantially horizontal plane;
at least one rake member disposed above said web;
at least one fluid removal member disposed above said web on an upstream side of said rake member;
wherein said fluid removal member takes the form of at least one suction bar disposed above said web, further comprising at least one suction nozzle and a fluid removal means.

10. The belt filter defined in claim 9, wherein the fluid removal means is operationally connected to a vacuum receiver and a pump.

11. The belt filter defined in claim 9 wherein said web has a pair of opposing longitudinal edges and said fluid removal member extends completely across said web and at least from one of said longitudinal edges to the other.

12. The belt filter defined in claim 11, wherein said web has a pair of opposing longitudinal edges and wherein said belt filter further comprises a pair of rails disposed alongside and parallel to said longitudinal edges of the web, said fluid removal member being supported on said rails.

13. The belt filter defined in claim 11, further comprising at least one frame, said fluid removal member and said rake member being mounted to said frame.

14. The belt filter defined in claim 13 wherein said rake member is rotatably mounted to said frame.

15. The belt filter defined in claim 13, wherein said frame is supported on a pair of rails disposed alongside and parallel to longitudinal edges of the web.

16. The belt filter defined in claim 11, wherein said fluid removal means is operatively connected to a receptacle.

\* \* \* \* \*